Feb. 5, 1957  H. W. RICHTER ET AL  2,780,147
METHOD FOR MAKING A WEDGE HEEL
Filed July 28, 1951  4 Sheets-Sheet 1

Inventors
Herman W. Richter
Harold R. Gillette
by Roberts, Cushman & Grover
Att'ys

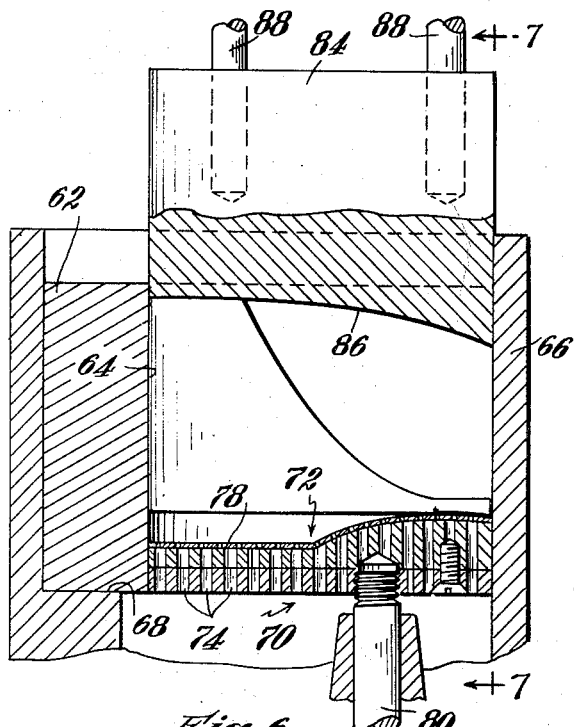
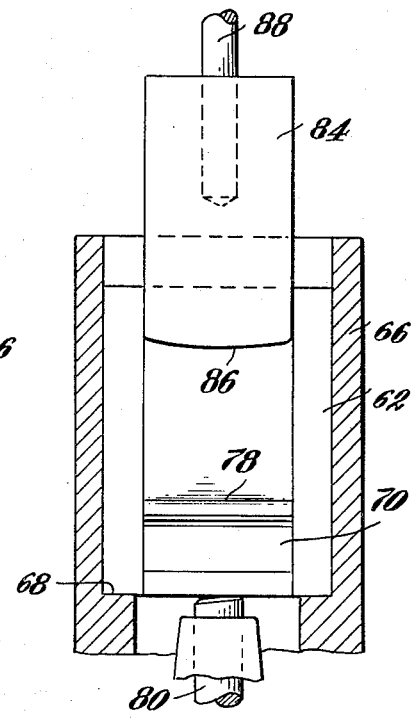
Fig. 6
Fig. 7
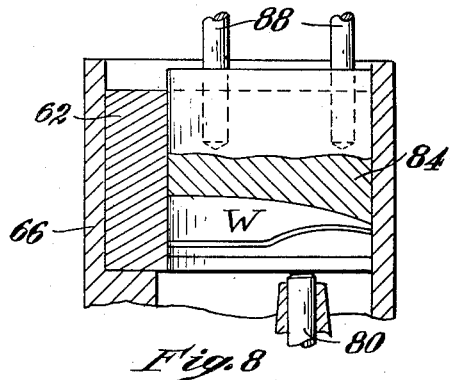
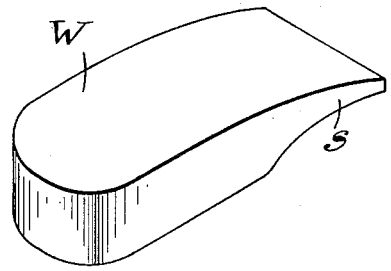
Fig. 8
Fig. 10
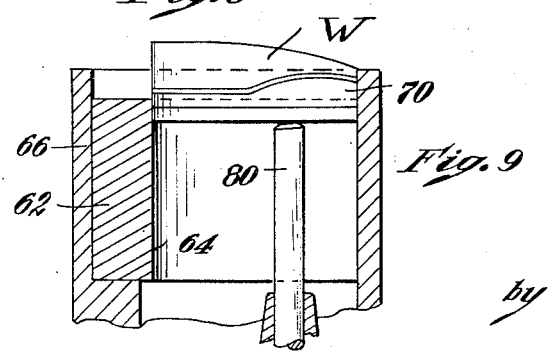
Fig. 9
Inventors
Herman W. Richter
Harold R. Gillette Feb. 5, 1957 H. W. RICHTER ET AL 2,780,147
METHOD FOR MAKING A WEDGE HEEL
Filed July 28, 1951 4 Sheets-Sheet 3

Inventors
Herman W. Richter
Harold R. Gillette
by Roberts, Cushman & Grover
Att'ys

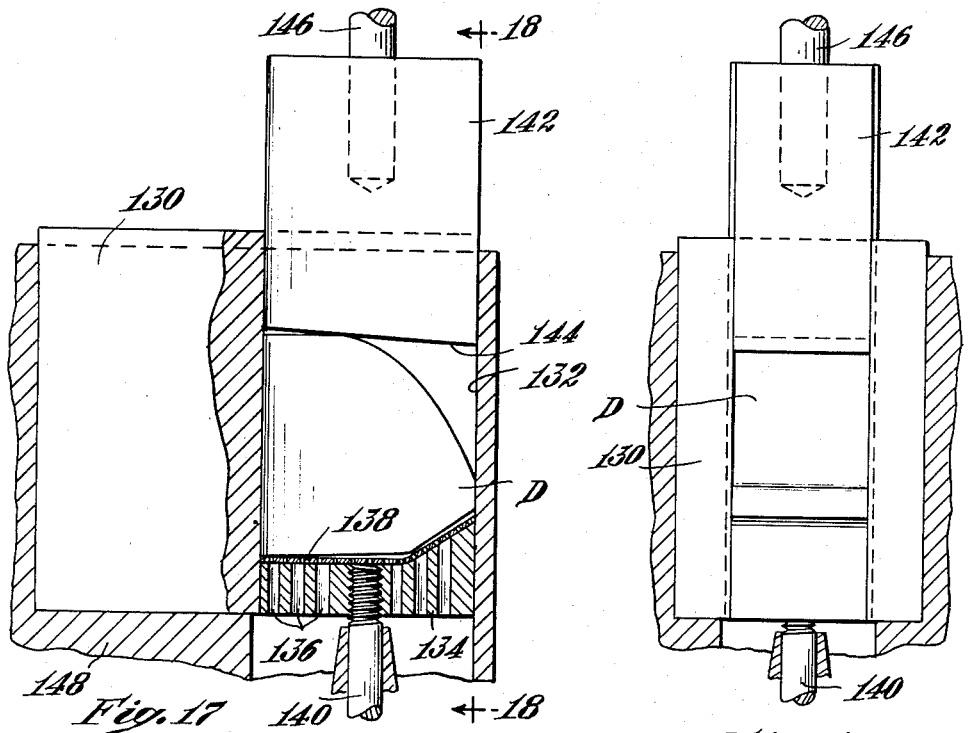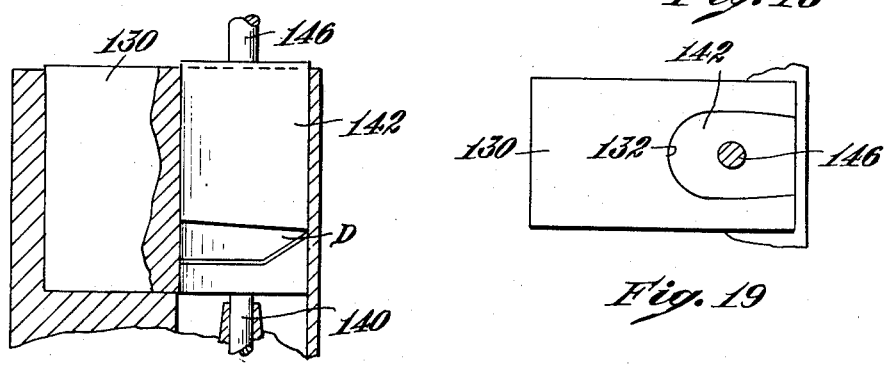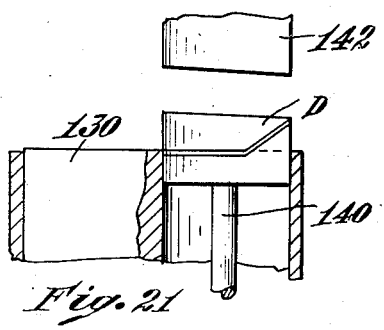

United States Patent Office 2,780,147
Patented Feb. 5, 1957

2,780,147

METHOD FOR MAKING A WEDGE HEEL

Herman W. Richter, Bridgewater, and Harold R. Gillette, Wellesley Hills, Mass.

Application July 28, 1951, Serial No. 239,092

2 Claims. (Cl. 92—54)

This invention relates to the manufacture of molded articles and more especially to making heels for shoes, and to a method for making the same.

The principal objects of the invention are to provide a light weight, rigid and durable wedge heel of the kind commonly used in the manufacture of California type shoes which are normally covered with a wrapper strip, which will be resilient enough to allow some flexibility without breaking, which will if necessary be dense enough to hold attaching means, such as nails and tacks, and which will be resistant to loss of shape or disintegration if it becomes water soaked. The term "wedge heel", as used in this specification means a shoe heel having a tapering portion which is wedge shaped in side elevation and which extends forwardly of and is integral with the heel seat portion of the heel. Another object of the invention is to provide a preform or embryo compact for making such a heel comprised of fibers associated in such manner as to be shape-retaining and of such shape that when subjected to compacting will provide a heel of the foregoing characteristics and of the proper shape and density. A further object of the invention is to provide an improved method or process of making wedge heels by forming them from a material predominantly of fibrous nature, without substantial waste of material and at a very low cost. A further object is to provide method for forming the preform and the final wedge heel directly from an aqueous dispersion of fibers, by successive operations in which a shape-retaining embryo is first made and then while still wet the embryo is compacted to final shape.

In accordance with the foregoing objects, the wedge heel is comprised of a dried compacted mass of waterlaid, fibrous material in which the fibers are distributed substantially uniformly throughout the heel and are bound together by an adhesive substance. A waterproofing compound may be incorporated in the fibrous mass of the heel. The preform or embryo from which the heel is made is in the form of an uncompacted mass of water-laid fibers having a transverse shape corresponding to that of the final heel but a thickness greatly exceeding that of the final heel and in which the fibers are substantially uniformly distributed throughout the mass. In the practice of the method a charge of fibers is confined so as to have a transverse section corresponding to that of the heel to be made and a thickness greatly exceeding that of the final heel, the heightwise section of the charge, however, having an overall shape corresponding roughly to the final heel, whereupon the major portion of the water is extracted in such manner and quantity as to provide a shape-retaining compact of fibers in which the fibers are condensed without application of pressure thereto. While still wet the preform is then further compacted by an application of pressure to reduce its heightwise thickness to the desired dimension of the final article while it is constrained against lateral deformation.

The apparatus for carrying out the foregoing method is comprised of a receptacle having a cross-section substantially corresponding roughly to that of the heel to be made into which a charge of fibers in aqueous dispersion may be placed and deep enough so that the thickness of the charge exceeds that of the article. The receptacle has bottom and top walls shaped to impart varying thickness to the uncompacted charge which corresponds generally in shape to that of the article and is designed to permit extraction of a major portion of the water from the charge without application of pressure thereto. To this end one or more of the walls of the receptacle is foraminous and there is means for maintaining a negative pressure outside of the wall to draw the water from the charge thereby leaving a shape-retaining composite of fibers which has the transverse and vertical dimensions of the receptacle. The apparatus also includes means for applying pressure to the wet preform in the form of a mold and a plunger movable within the mold to apply pressure in a direction perpendicular to its section thereby to reduce the thickness of the preform the desired amount. The bottom of the mold and the plunger are so shaped as to impart the desired shape to the top and bottom surfaces of the heel.

A resinous water-proofing and binding material, a filler and a composition for imparting wet-strength are incorporated in the aqueous dispersion of fibers and after the fibers are collected and compacted, the wet compact is first dried and then subjected to heating for a sufficient length of time and at a high enough temperature to cure the wet-strength composition and to disperse the resinous water-proofing and binding material throughout the mass. Alternatively, the drying and heating may be carried out as one operation.

The invention will now be described in greater detail with reference to the accompanying drawings wherein:

Fig. 6 is a vertical longitudinal section through the mold for making the final pressed article;

Fig. 7 is a section taken along lines 7—7 of Fig. 6;

Fig. 8 is a vertical section corresponding to Fig. 6 to smaller scale, showing the plunger lowered within the mold in the position imparting the final shape to the article;

Fig. 9 is a vertical section corresponding to Fig. 8, showing the lower wall of the mold elevated to eject the molded article;

Fig. 10 is a perspective view of the finished article;

Fig. 17 is a vertical section through a mold and plunger for pressing the preform;

Fig. 18 is a section taken on the line 18—18 of Fig. 17;

Fig. 19 is a plan view of the mold;

Fig. 20 is a vertical section to smaller scale showing the position of the plunger in the mold after compacting of the preform;

Fig. 21 is a fragmentary view of the mold to smaller scale with the lower wall elevated to discharge the finally pressed heel; and Fig. 22 is a perspective view of the finally formed heel.

Figure 1:
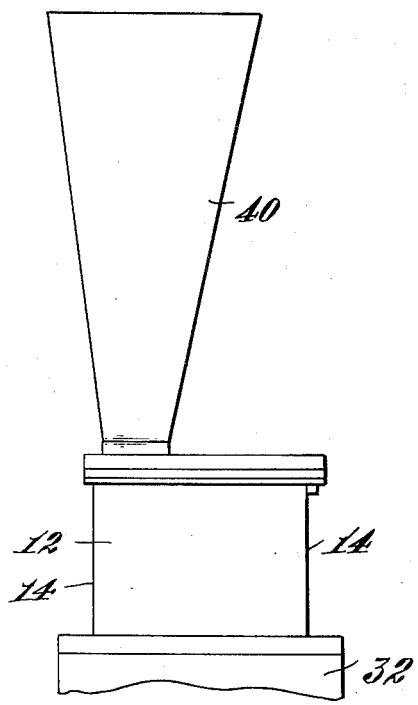
Fig. 1 is a side elevation of the receptacle for making the preform.
Figure 2:
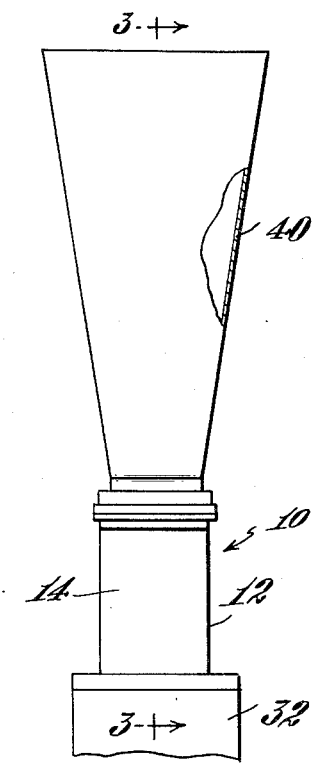
Fig. 2 is a front elevation of the receptacle for making the preform.

The practical aspects of the present invention resides in being able to use approximately the right quantity of material for making a heel or other article and then molding the charge by a series of operations which will be described hereinafter, thereby eliminating the high percentage of waste attendant on turning and/or dieing operations such as are required in making wood heels or cutting heels from composition sheet material.

The material to be used is fluent and preferably consists of an aqueous dispersion of wood pulp which has been somewhat refined in a Hollander beater or other suitable refining equipment. The fiber length of the wood pulp is relatively unimportant and in fact it has been found economical to use what is termed as screenings, that is coarse materials that do not pass through pulp or stock screens. To the aqueous dispersion of fibers there is added powdered charcoal, expanded vermiculite or other suitable bulky filler. To make the final product wet-proof, that is so that it will not disintegrate if it should become soaked with water, and to bond the fibers together there may be added to the aqueous dispersion a powdered "Vinsol" type resin and melamine-formaldehyde resin or their equivalents. "Vinsol" is a Hercules Powder Company trade name for a resin manufactured in the following manner: Rosin is extracted from pine wood by the use of a suitable solvent, such as a hot gasolene, benzol, etc., after steaming of the wood with live steam to remove volatile oils, such as turpentine, and pine oil. Again, volatile oils, as turpentine, and pine oils, may be extracted with the resin without first steaming for their removal. Following extraction, the extract is distilled by the removal of solvent in those cases where the wood was subjected to steaming before extraction; or for the removal of solvents and volatile oils, as turpentine and pine oils in those cases where the wood was extracted directly without steaming. As the result of distillation a resinous material containing abietic acid and admixed impurities is obtained. This resinous material may be treated in any one of a number of ways, all known to the art, for the removal of refined resin high in abietic acid. The residue after the removal of refined resin and comprising a dark colored, hard, resinous mass low in abietic acid constitutes an extracted pine wood pitch, or "Vinsol" type resin employed in the present invention.

While as heretofore stated the fiber length of the paper pulp is not critical, it has been found advantageous for the purpose of minimizing shrinkage of the article during the drying operation to use a hardwood sulphate pulp.

A specific composition which has been found to yield satisfactory results was prepared by introducing 10 pounds of hardwood sulphate pulp with 310 pounds of water into a 10 pound Hollander beater, that is a beater rated as of 10 pound capacity. This pulp was defibrillated with the roll of the beater raised several turns above the bedplate so that no refining of the pulp took place until the beater was loaded. When defibrillization was complete an additional 20 pounds of water was added to compensate for the "slop-over" during the loading operation and the roll was then set down to produce a degree of refining of the stock. The refining was continued until the stock had a freeness as measured on the Williams precision freeness tester, when diluted to a consistency of $3/10$ of 1%, of 30 seconds. The roll was then raised so that no further refining would take place and there was added to the slurry 2 pounds 2½ ounces of powdered hardwood charcoal and 4 pounds 13½ ounces of pulverized Vinsol resin.

The contents of the beater were now dumped into a stuff chest located beneath the beater and the beater was washed down with 110 pounds of water to transfer all the material into the chest.

A stock melamine-formaldehyde resin solution had been prepared by adding 171 ccs. of 20° Bé. hydrochloric acid to 3,722 ccs. of water and heating to 35° C. and to this there was added 513 grams of powdered melamine-formaldehyde resin known as "Parez #607." This solution was allowed to age for 3 hours and was then diluted with water to a total volume of 17,032 ccs. Of this stock solution 7,560 ccs. were now added to the compounded stock in the chest and a uniform mixture of all components was secured by thorough stirring with an agitator with which the stuff chest was equipped. The compound was then in condition for use in the molding operation and had a consistency of about 3% solids to 97% water.

It is not uncommon to make articles of paper fibers directly from an aqueous dispersion of the fibers, however, an aqueous dispersion of fibers does not have the characteristics of a true plastic material and while it is amenable to molding operations by the application of pressure to squeeze out the water and to form a compact body where the article to be made is of uniform or symmetrical shape and density, it does not behave in a satisfactory manner if the article to be made varies in thickness and densities of different degrees in different parts of the article are required.

To illustrate, if an aqueous dispersion of fibers, that is a pulp slurry, is compressed in a conventional mold, it is possible of course to produce a wedged-shaped article such as a wedge heel by providing suitably inclined surfaces at the bottom of the mold and at the end of the pressing die which is forced into the mold cavity to compact the slurry. Because of the lack of flow referred to however, this wedged-shaped article will have a thick foreportion instead of the desired thin one, and this thick foreportion will have an unusually high density, because substantially the same amount of pulp will have been consolidated in this section as has been consolidated into the thicker rear portion. Moreover, because this foreportion has absorbed the greater part of the pressure applied by the die, the thicker rear portion will be of low density. Such an article, when dried, will not have the mechanical strength in the rear portion to withstand the pressure applied in affixing the wedge heel to the shoe and may be crushed, that is, will be consolidated further in this operation. Since these wedgies are customarily covered with fabric or other material, the final result will be a very unsatisfactory one in that the covers will wrinkle badly. Furthermore, the lack of sufficient density of the material in the rear portion will result in inferior nail holding ability, a fact which is of importance in certain types of shoe construction. If on the other hand the pulp mass is first preformed prior to pressing to have an overall shape roughly corresponding to the article to be produced, that is a wedge-shaped article having a thin front end and a thicker rear portion, it is found that when consolidated by pressing to final shape will be substantially uniformly dense throughout. Optionally, when preforming is employed, the density may be made to vary in different parts of the article, to impart desired properties to those parts. It is apparent that by properly proportioning the height of the preforming mold, that is the transverse and vertical contour of the preforming receptacle and hence of the preform, density and strength may be controlled in different parts of the article.

In accordance with the foregoing and as practiced herein, a predetermined charge of fibers in aqueous dispersion is first preshaped within a walled receptacle which has a cross-section corresponding roughly to that of the article to be made and a depth materially exceeding that of the finished article, that is deep enough to hold an uncompressed preform of such thickness that when finally compacted under pressure will give an article of the desired thickness. A suitable charge of fibers of predetermined quantity is supplied to the receptacle and a substantial part of the water is removed so that as the bulk is reduced by the extraction of the water the entire charge of fibers settles into the receptacle and takes its shape. Hence the preform is initially shaped by the walls of the mold so as to be generally like that of the final article but since no pressure is employed during the preforming the fibers are distributed uniformly throughout the preform. The fibers will be roughly parallel to the drainage surface. This shape-retaining compact or embryo while still wet is now subjected to externally applied pressure at one end while constrained at its opposite end and against lateral distortion so as to reduce its height to the desired dimensions. Under uniform pressure the thicker and thinner parts of the preform will be reduced proportionally so that the desired thickness may be obtained throughout the article without sacrificing strength or density in any of its parts.

Figure 3:
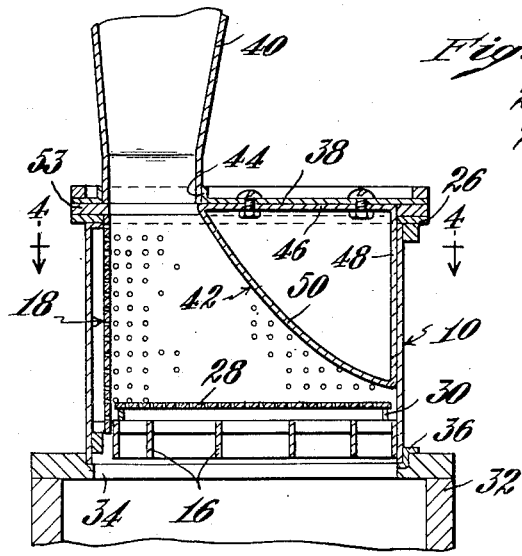
Fig. 3 is a vertical section of the receptacle for making the preform taken on the line 3—3 of Fig. 2.
Figure 4:
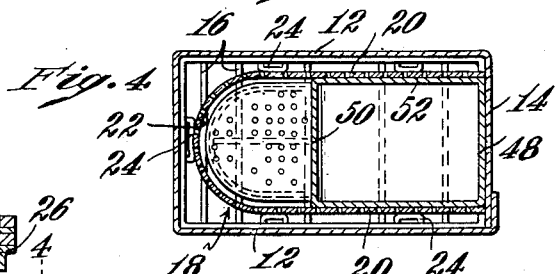
Fig. 4 is a horizontal section of the receptacle for making the preform taken on the line 4—4 of Fig. 3.
Figure 5:
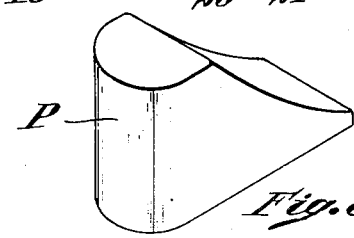
Fig. 5 is a perspective view of a preform.

Apparatus for making a preform and the finally pressed article is shown in the accompanying drawings, that illustrated in Figs. 1 to 10 inclusive being designed to manufacture what is commonly known as a wedge-heel *w*, which at its forward or breast line has a tapering projection which forms part of the shank *s* of the shoe in which it is incorporated. The expression "side wall of the finished wedge heel" as used in the claims includes the side wall of the heel W which extends from one end of the thin straight front or wedge end wall around one side of the heel, the rear end thereof and the opposite side thereof back to the opposite end of said thin front end wall, but it does not include said thin front end wall. Referring to the drawings the apparatus for making the preform *p*, a perspective view of which is shown in Fig. 5, consists of a substantially rectangular container 10, open at its bottom and top and having side and end walls 12 and 14. Within the receptacle at its lower end there are fastened transversely thereof, that is between the walls 12—12 a plurality of horizontal spaced bars 16. An insert 18 made of a foraminous material such as 60 mesh metal screen is placed within the receptacle 10 with its lower part resting on the bars 16. The insert 18 is shaped to have the cross-section of the article to be made and as shown in Fig. 4 U-shaped, that is has spaced parallel walls 20—20 joined at one end by a circular end wall 22 and open at its opposite end. The walls 20—20 at the open end of the U-shaped insert are fastened, for example by welding to one of the end walls 14 and a plurality of spacers 24 are distributed along the side walls and the curved end wall to hold the insert uniformly spaced from the walls 12 and 14. The lower edge of the insert may be slotted at appropriate places so as to fit over the upper edges of the bars 16. A flange 26 is attached to the upper open end of the receptacle 10, a portion of which extends inwardly and the upper edges of the walls of the insert 18 are welded thereto. A flat foraminous bottom wall 28 also of 60 mesh screen similar to that used for making the insert and shaped so as to fit within the U-shaped walls, is fastened by welding or soldering to a rigid transversely reinforced U-shaped frame 30 and is disposed at the bottom of the insert on the bars 16, thus providing a foraminous bottom for the receptacle. The receptacle is set on top of a box 32 with its lower open end directly over an opening 34 in the top of the box and provision is made for maintaining a negative pressure within the box, for example about 25 inches of mercury. In order to maintain a vacuum tight connection between the receptacle and the box the lower end of the receptacle is gasketed where it is set into the box as shown at 36. The top of the receptacle is provided with a suitable cover plate 38 which is removable and carries a charging funnel 40 and a forming member 42 adapted when the cover is placed on top of the receptacle to fit into the insert. The lower end of the funnel 40 is set into a flanged opening 44 through the cover plate and provides means by which a suitable charge of the material to be molded may conveniently be introduced to the receptacle. Since the charge is of greater volume prior to the removal of the water therefrom than the receptacle the funnel serves to take up the extra volume and to feed it to the receptacle as the volume of the charge in the receptacle is shrinking by removal of the water. The charge is of predetermined size so that when all of the water to be extracted has been removed the fibers will have settled into the receptacle and taken its shape. The forming member 42 is fastened to the underside of the cover plate 38 and is substantially triangular in cross-section as shown in Fig. 3, having a horizontal portion next to the cover, a vertical portion extending downwardly against the inside of the end wall 14 and an inclined portion extending diagonally between the ends of the portions 46 and 48. The forming member has lateral or side walls 52 joined to the edges of the portions 46, 48 and 50, and the overall width of the member is such that it will closely fit within the walls 20—20 of the insert as shown in Fig. 4, when the cover is applied, thereby filling approximate with the upper right hand quarter of the insert. Thus the space available for the charge of fibers has a vertical section schaped somewhat like a shoe, that is it has a flat bottom, vertical back part and an inclined forepart. It is evident therefore, that when the fiber mass is completely contained within the insert, the water having largely been extracted, it will have a rear part of much greater thickness than the forepart and will roughly correspond in shape to the article to be made. A gasket 53 is provided between the cover and the flange 26 to maintain the apparatus vacuum tight during extraction of the water.

With the foregoing apparatus a preform of the shape shown in Fig. 5 may be made by pouring a charge of fibers in aqueous dispersion such as described above into the funnel 40 and then extracting the major portion of the water from the dispersion through the bottom and side walls 28, 20 and 22. This is effected by maintaining a negative pressure of approximately 25 inches of mercury in the box 32 so as to draw the water through the foraminous walls and bottom downwardly from the receptacle 10 into the box. Sufficient water is extracted to provide a shape-retaining compact of fibers. Following extraction of the water the cover is removed from the top of the receptacle and then the preform is removed by pushing the bottom 28 upwardly within the receptacle.

While the preform is still wet it is transferred to a mold 62 such as illustrated Figs. 6 and 7 which has an internal cavity 64 corresponding substantially in cross-section to that of the preform being very slightly larger than the preforming receptacle to permit easy introduction of the preform into the mold and of a depth sufficient to contain the entire preform. The mold 62 is open at its bottom and top ends and is contained within a rectangular box 66 also open at its bottom and top ends. As illustrated the lower end of the mold sets on a ledge 68 in the box which runs along its opposite sides and one end. For convenience in making the mold, the mold is constituted by a block 62 which may be open at its forward end and if such is the case the end wall of the box 66 forms a closure therefor. The bottom of the mold is constituted by a block 70 which fits into the lower end of the mold cavity and has an upper surface 72 corresponding in shape to the bottom of the heel to be formed, that is has a substantially flat rear part and an upwardly convex forward part which constitute respectively the ground engaging part of the heel and the arc of the shank. The block has a plurality of vertical holes 74 through it and is faced on its top surface with a perforated plate 78 of the same kind as used in the preforming apparatus. The block is normally held in position at the lower end of the mold by one or more posts 80 threaded into the bottom side and is movable vertically to raise the bottom of the mold for the purpose of ejecting the finally pressed article. Since several tons pressure is applied, added support may be supplied by inserting rigid bars in the box 66 immediately below the block so as to bear the direct pressure. The top of the mold is constituted by a plunger 84 having a cross-section corresponding to that of the mold and a lower or acting surface 86 corresponding to the shape of the top side of the heel. The plunger is fastened to the lower ends of a pair of rods 88—88 suitably arranged to permit application of downward motion to the plunger 84 to press the preform against the bottom of the mold and thereafter to retract the plunger so that the finished article may be removed from the mold. During the application of pressure to the top of the preform the contour of the bottom of the plunger and the top of the bottom member are imparted to the preform and the latter is reduced in thickness to the extent desired, the excess water being squeezed from the preform and draining through the perforate bottom. The water squeezed out may be allowed to drain solely by gravity, however, to expedite disposal of the water a vacuum, that is a negative pressure may be maintained in the box 66 below the bottom wall of the mold. The finally pressed article has the shape shown in Fig. 10, that is a heel part of substantially uniform thickness and a shank of tapering thickness projecting forwardly from the breast line of the heel.

By imparting the initial shape to the preform as shown in Fig. 5, the desired thickness and density is imparted to the rear portion of the heel so that nails employed for fastening the heel to the shoe will not pull out and at the same time the forepart of the heel will have the desired strength and resilience to function satisfactorily as a shank.

The foregoing apparatus, that is the preforming apparatus and the molding apparatus may be suitably arranged so that the whole process is substantially automatic.

Figure 11:
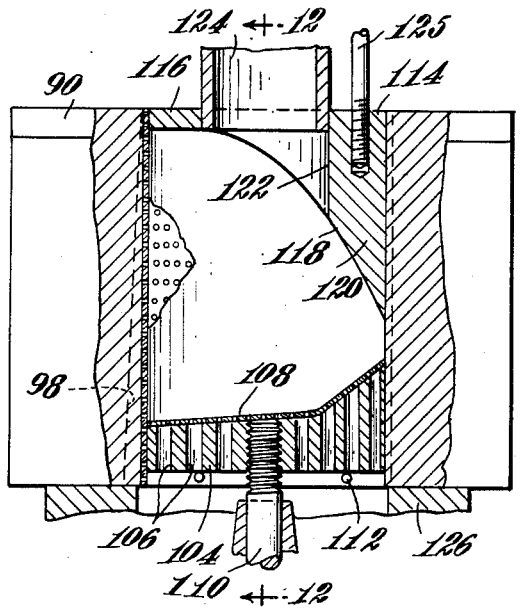
Fig. 11 is a vertical section through an alternative form of apparatus for making the preform.
Figure 12:
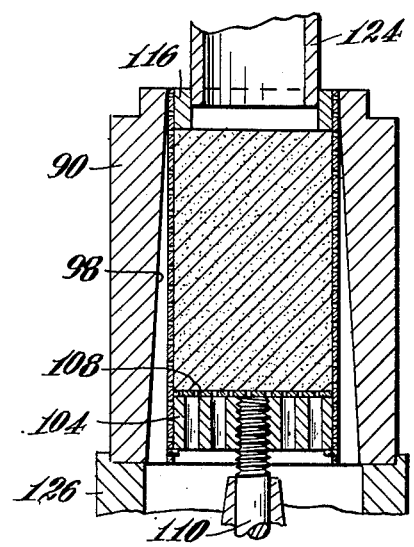
Fig. 12 is a vertical section taken on the line 12—12 of Fig. 11.
Figure 14:
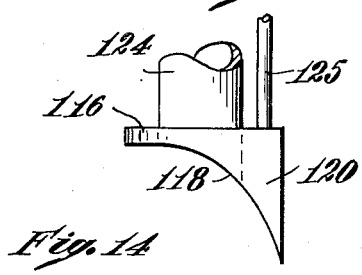
Fig. 14 is an elevation in smaller scale of the details of the upper wall of the forming member.
Figure 13:
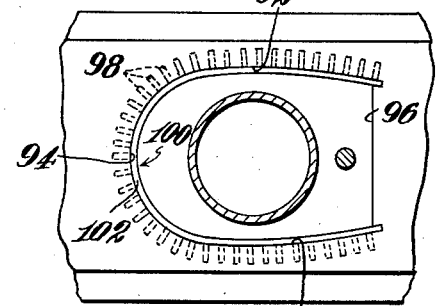
Fig. 13 is a top plan view of Fig. 12.
Figure 15:
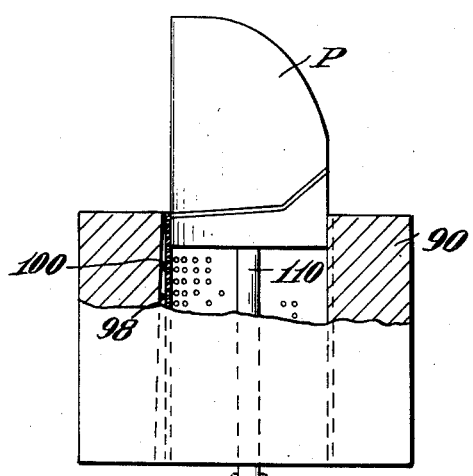
Fig. 15 shows a vertical section of the mold to smaller scale with the lower wall elevated to discharge the preform.
Figure 16:
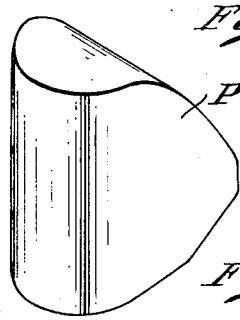
Fig. 16 is a perspective view of the preform.

The pre-molding equipment described above is illustrated as made of sheet metal, however, it is susceptible to construction from other material, for example cast metal or a moldable plastic as was the pressure mold. The use of a plastic preforming receptacle as well as the pressing mold is shown in Figs. 11 to 21 inclusive, designed to produce a heel of somewhat different shape called a "Dutchy," a perspective view of which is shown in Fig. 22. The "Dutchy" heel has a substantially uniformly thick rear part and a short wedge-shaped breast. The term "wedge heel" as used in the claims includes a heel of the shape shown in Fig. 22. Referring to the figures, the preform receptacle comprises a block 90 which has a cavity closed at its sides but open at its top and bottom corresponding substantially in cross-section to the cross-section of the shape of the article to be formed, that is has spaced parallel side walls 92 (Fig. 13), a curved end wall 94 and a flat end wall 96. Vertical slots 98 are made in the walls extending from the upper open end of the receptacle to the lower open end except for the flat end wall 96 which increase in depth as they approach the bottom. An insert 100 in the form of a foraminous plate 102 is placed within the cavity against the wall so as to conform thereto. The bottom wall of the mold is in the form of a block 104 which fits into the lower end of the cavity and has a plurality of vertical openings 106 therein. The upper surface of the block is covered with a foraminous plate 108 and is shaped roughly like the bottom of the heel to be made, that is has a nearly flat rear part and an upwardly inclined forward part. A rod 110 is threaded into the bottom side of the block to provide means for raising and lowering the block within the mold. If desired, limit pins 112 may be provided at the lower end of the mold projecting inwardly from the inner walls to support the block at its lowermost position. The upper wall of the mold is constituted by a cover block 114 having a flat upper surface 116 and an under surface 118 which slopes downwardly and forwardly forming a wedged-shaped projection 120, as shown in Fig. 11 which fits into the forward end of the cavity filling approximately the upper right hand quarter thereof. At about the center of the block there is an opening 122 in which there is secured the lower end of a charging or feed-pipe 124, for delivering the slurry of fibers to the mold. One or more rods 125 are threaded into the top of the block 114 which provides means for holding the block on its correct heightwise position and for withdrawing it when it is necessary to discharge the preform. As will be seen by reference to Fig. 12, the walls of the insert are substantially vertical whereas the inner walls of the grooves 98 diverge from the upper end of the block toward the lower ends so as to leave a clearance between them and the foraminous wall of the insert through which water in the charge may be drawn to the box 126 on which the block rests and in which a negative pressure is maintained. After the water has been extracted from the charge so as to provide the preform shown in Fig. 16, the top 114 is removed and the preform is discharged by elevating the bottom block 104 as shown in Fig. 15. The preform (Fig. 16) is now transferred to the final pressing mold which is also made of plastic. As illustrated in Figs. 17 to 21, the mold consists of a block 130 having cavity 132 corresponding in cross-section to the article to be produced and is of sufficient depth to hold the entire preform. The mold is open at its lower and upper ends and the lower wall is constituted by a block 134 which is substantially like that used in the preform mold. As illustrated in Fig. 17, it has vertical holes 136 therein, is faced on its upper surface with a foraminous plate 138 and a rod 140 threaded into its bottom side so that it may be elevated within the mold. The upper surface of the block 134 is shaped to give the exact contour of the bottom side of the article to be formed, that is has a flat rear part and an inclined forward part corresponding to the ground engaging portion of the heel and the inclined face of the breast. The upper wall of the mold is in the form of a plunger 142 for pressing the preform downwardly against the bottom and is shaped transversely to fit into the mold cavity and to slide vertically therein. The lower or acting face 144 is nearly flat corresponding in shape to the upper surface of the article to be formed. A rod or rods 146 threaded into the top of the plunger provided for forcing the plunger into the mold and withdrawing it when required. The preform is placed in the mold cavity so that it rests on the bottom and then the plunger 142 is lowered and pressed down so as to squeeze the preform to the thickness indicated in Fig. 20. As previously stated the water may be disposed of by gravitation, however, to expedite such a negative pressure may be maintained in the disposal box 148 below the mold so as to remove the excess water which is expressed from the article during the final pressing operation. Following final pressing the plunger 142 is lifted and the block 134 is elevated as shown in Fig. 21, so as to discharge the article from the mold.

The wet compressed wedgie or "Dutchy" as the case may be formed in the manner described above at the end of the final pressing operation, consists of about 50% of water and 50% solid constituents. To produce a usable heel, the wet compress is now dried at a temperature of about 270 to 300° F. The drying is carried out as rapidly as possible with good air circulation but with sufficient moisture in the air to prevent uneven shrinkage and distortion. It has been found that a drying period of one hour is required, using the above mentioned temperature, to produce a satisfactory article.

Following drying the heel is heated for 1½ hours at a temperature of about 140° C., to flux the resin throughout, that is to cause complete curing of the melamine-formaldehyde resin and to effect a dispersion of the Vinsol resin in the finished article. In some instances, it has been found unnecessary to flux completely, surface fluxing, as by infra-red rays, having proved adequate. The melamine-formaldehyde resin imparts wet-strength to the article while the Vinsol resin flows along the fibers and welds one to another thereby promoting mechanical strength in the article as a whole and imparting water resistance thereto.

Alternatively, the drying period and heating period may be combined and when a temperature of as much as 300° F. is employed, a total period of 1 hour is sufficient to accomplish both drying and curing.

The term "positive pressure" as used in the claims means a pressure which is in excess of atmospheric pressure. The term "negative pressure" as used in the claims means a pressure which is below atmospheric pressure.

It should be understood that the present disclosure is for the purpose of illustration only and that this invention includes all modifications and equivalents which fall within the scope of the appended claims.

We claim:

1. A method of making a wedge heel having portions of different thickness comprising an uncompressed, integral, coherent, self sustaining, shape-retaining, wet, wedge-shaped preform unit comprising fibers and having a transverse section not substantially exceeding that of the wedge heel to be made and a vertical section exceeding that of the wedge heel but varying substantially in height with corresponding variations in the thickness of the wedge heel so that when the preform is compressed it will have the requisite thickness and density in its various parts, by initially concomitantly dewatering and collecting such preform unit in a single chamber while the walls of the chamber are stationary from a charge comprising fibers in aqueous dispersion without applying external positive pressure to the charge by applying negative pressure to the outer surface of the stationary perforate chamber bottom wall and to the outer surface of at least that part of the stationary perforate chamber side wall which is adjacent to that part of the charge which will form the side wall of the finished wedge heel while maintaining at least one of the surfaces of said charge which will form the bottom surface of the finished wedge heel and the surface of said charge which will form the top surface of the finished wedge heel with an incline substantially greater than the incline of the corresponding surface of the finished wedge heel by contacting the major portion at least of said one surface of said charge during said dewatering and collecting step with a stationary and substantially rigid chamber wall surface having a substantially greater incline than the corresponding surface of the finished wedge heel so that the constituent fibers are substantially homogeneously distributed throughout the body of said preform unit and then compressing the wet preform unit heightwise in a mold by applying positive pressure to at least one of a mold member having a surface contour corresponding to substantially to entire top surface of the finished wedge heel and a mold member having a surface contour corresponding to substantially the entire bottom surface of the finished wedge heel, while constraining the preform unit against lateral deformation thereby to reduce the preform unit to the requisite thickness and surface contour in its various parts without causing substantial lateral movement of the fibers of the preform unit.

2. A method of making a wedge heel having portions of different thickness comprising an uncompressed, integral, coherent, self sustaining, shape-retaining, wet, wedge-shaped preform unit comprising fibers and having a transverse section not substantially exceeding that of the wedge heel to be made and a vertical section exceeding that of the wedge heel but varying substantially in height with corresponding variations in the thickness of the wedge heel so that when the preform is compressed it will have the requisite thickness and density in its various parts, by initially concomitantly dewatering and collecting such preform unit in a single chamber while the walls of the chamber are stationary from a charge comprising fibers in aqueous dispersion without applying external positive pressure to the charge by applying negative pressure to the outer surface of the stationary perforate chamber bottom wall and to the outer surface of at least that part of the stationary perforate chamber side wall which is adjacent to that part of the charge which will form the side wall of the finished wedge heel while maintaining at least one of the surfaces of said charge which will form the bottom surface of the finished wedge heel and the surface of said charge which will form the top surface of the finished wedge heel with an incline substantially greater than the incline of the corresponding surface of the finished wedge heel by contacting the major portion at least of said one surface of said charge during said dewatering and collecting step with a stationary and substantially rigid chamber wall surface having a substantially greater incline than the corresponding surface of the finished wedge heel and then compressing the wet preform unit heightwise in a mold by applying positive pressure to at least one of a mold member having a surface contour corresponding to substantially the entire top surface of the finished wedge heel and a mold member having a surface contour corresponding to substantially the entire bottom surface of the finished wedge heel, while constraining the preform unit against lateral deformation thereby to reduce the preform unit to the requisite thickness and surface contour in its various parts without causing substantial lateral movement of the fibers of the preform unit.

References Cited in the file of this patent

UNITED STATES PATENTS

| Number | Name | Date |
|---|---|---|
| 234,694 | Stevens et al. | Nov. 23, 1880 |
| 237,626 | Stevens et al. | Feb. 8, 1881 |
| 410,977 | Keyes | Sept. 10, 1889 |
| 829,645 | Goeb | Aug. 28, 1906 |
| 1,270,586 | Ayres | June 25, 1918 |
| 1,367,096 | Rivers | Feb. 1, 1921 |
| 1,444,878 | Hunt | Feb. 13, 1923 |
| 1,474,860 | Talbot | Nov. 20, 1923 |
| 1,873,585 | Harvey | Aug. 23, 1932 |
| 2,046,750 | Mason et al. | July 7, 1936 |
| 2,198,634 | Richter | Apr. 30, 1940 |
| 2,220,047 | Mason | Oct. 29, 1940 |
| 2,280,099 | Sheesley | Apr. 21, 1942 |
| 2,330,233 | Morris | Sept. 28, 1943 |
| 2,369,488 | Perry | Feb. 13, 1945 |
| 2,408,734 | Chaplin | Oct. 8, 1946 |
| 2,424,189 | Randall | July 15, 1947 |
| 2,428,512 | Brubacher | Oct. 7, 1947 |
| 2,563,897 | Wilson et al. | Aug. 14, 1951 |
| 2,628,540 | Randall | Feb. 17, 1953 |
| 2,693,740 | Cooper et al. | Nov. 9, 1954 |